United States Patent Office 2,696,476
Patented Dec. 7, 1954

2,696,476

VULCANIZABLE COPOLYMERS OF DIOLEFINS WITH A THIOPHENE

Wilson M. Kleibacker, Salem, Mass., assignor to United Shoe Machinery Corporation, Flemington, N. J., a corporation of New Jersey No Drawing. Application May 29, 1951, Serial No. 228,966

11 Claims. (Cl. 260—5)

This invention relates to new vulcanizable polymeric materials and to methods of making and using the same in vulcanizable compositions.

Much effort has been expended in the attempt to provide compositions which are soft or limp and readily deformable in normal condition but which are readily converted to a stiff resilient condition. Compositions have been developed which are suitable for some uses, but for special purposes, for example in the stiffening of the end portions of shoes, many of these compositions have proved not satisfactory. Compositions which possess adequate shelf life may take too long to cure, or be too expensive, or lack adequate strength or stiffness.

It is a feature of the present invention to provide a new method of polymerization to form a liquid sulfur-vulcanizable copolymer.

It is an additional feature of the present invention to provide a new, rapidly vulcanizable polymeric material which in unvulcanized condition is compatible with and exerts a softening effect on linear polymeric plastics.

It is a further feature of the present invention to provide an inexpensive composition which is normally limp and flexible and possessed of good shelf life and which is readily converted by a short heat treatment to a stiff resilient condition.

I have discovered that sulfur-vulcanizable viscous liquid copolymers of a conjugated diene and a thiophene may be formed by heating mixtures of a diene and a thiophene under pressure in the presence of a radical-forming catalyst. I have further discovered that these vulcanizable copolymers are compatible with and may be used to soften and plasticize natural rubber and synthetic rubber-like materials including butadiene polymers, butadiene-styrene copolymers, polychloroprene, and butadiene acrylonitrile copolymers.

The copolymer of the present invention is formed by the reaction at relatively high temperatures and pressures of a conjugated diene with a thiophene in the presence of a radical-forming catalyst. As is known, radical forming catalysts, such as the peroxides, and hydroperoxides, split when subjected to heat to form radicals which add to polymerizable diene molecules to form addition products which themselves are radicals capable of adding to further polymerizable diene molecules. In the claims the term "peroxides" is to be understood as including both the "peroxides" and the "hydroperoxides."

The reaction involved is represented by the following series of equations:

*Peroxidic mechanism*

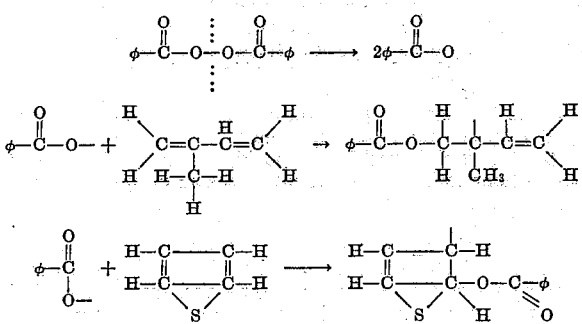

where $\phi = C_6H_5$.

This reaction product is different chemically from the product obtained by polymerization with ionic polymerization catalysts such as the boron trifluoride, hydrogen fluoride system which is considered to follow the series of reactions represented below:

*Ionic mechanism*

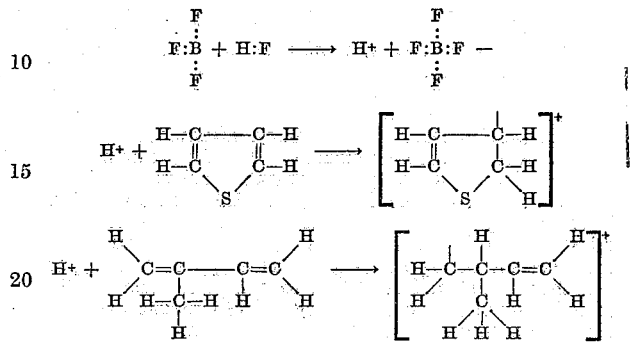

The copolymers of the present invention are prepared from mixtures of 60 to 140 parts by weight of a conjugated diene such as isoprene, butadiene, methyl pentadiene, dimethyl butadiene and 2-chloro-butadiene 1,3, with 100 parts by weight of a thiophene, such as 3-methyl-thiophene, 2-acetyl thiophene and thiophene. A small percentage of a radical-forming catalyst is added to the mixture and the mixture is subjected to heat and pressure to effect copolymerization.

Suitable radical-forming catalysts include t-butyl hydroperoxide, diazoaminobenzene and benzoyl peroxide. These catalysts may be employed in concentration of about .1% to 1.0%, preferably about .35% based on the combined weight of the diene and the thiophene.

Polymerization of the reaction mixture to form the new copolymers requires a temperature of from 90° C. to 130° C. and a relatively high pressure. Pressures which have been found satisfactory range from about 400 to about 1200 pounds per square inch. Under these conditions, the polymerization is substantially completed in from 5 to 20 hours with formation of a viscous liquid, light to dark brown in color and with a characteristic odor resembling that of crude petroleum.

Readily deformable compositions which are vulcanizable to a stiff resilient condition according to the present invention may be prepared by intimately mixing the liquid copolymer of a diene and a thiophene with a linear polymeric plastic such as a rubbery polymer or copolymer and a vulcanizing agent. Rubbery polymers which are useful in such compositions include natural rubbers and synthetic rubbers such as the rubbery copolymers of butadiene and acrylonitrile, copolymers of butadiene and styrene, and polychloroprene. The amount of liquid copolymer to be added will depend on the extent of softening or plasticization desired. Significant softening effects are observed when as little as 5% of the liquid polymer is added but compositions which are quite soft and deformable in uncured state and curable to a strong stiff condition will ordinarily comprise from 25 to 50% by weight of the combined weight of copolymer and plastic, and may be vulcanized with the aid of known vulcanization systems involving the use of sulfur and vulcanization assistants. It has been found that the copolymer vulcanizes with extreme rapidity and, particularly where high-frequency electric heating is employed, vulcanizes in a matter of a few seconds.

The following examples are given to aid in understanding the invention and it is to be understood that the invention is not restricted to the details of proportions, conditions or special reagents employed.

Example 1

An autoclave was charged with 68 parts by weight of isoprene, 53.5 parts by weight of thiophene and 0.6 parts by weight of diazoaminobenzene.

The mixture was heated to a temperature of 120° to 125° C. under nitrogen pressure of 700 pounds per square inch for sixteen and one-half hours. Heating was discontinued and the product discharged from the autoclave as a dark-colored viscous liquid. This liquid reaction product was poured into excess methanol causing the separation of a thick dark-brown liquid. Methanol was decanted from the thick liquid and the liquid further heated to expel methanol.

A mixture for plasticization with the above polymeric material was prepared by milling on a 2-roll mill at 70° to 80° C. 50 parts by weight of Marbon S (a copolymer of butadiene and styrene in the ratio of 85:15), 25 parts by weight of GRS synthetic rubber, and 35 parts of Spheron C, a rubber-reinforcing channel carbon black.

75 parts of this mixture were milled with 25 parts of the liquid polymeric material. Thereafter the mill rolls were cooled to about 30° C. and there was added on the mill 0.6 part of Altax (benzothiazyl disulfide), 0.6 part of Captax mecaptobenzothiazole and 0.12 part of methyl Zimate (zinc dimethyldithiocarbamate), 3.0 parts of zinc oxide, 0.5 part of stearic acid, and 2.5 parts of sulfur. When mixing was complete, the mixture was sheeted to a thickness of 0.030 inches. Box toe blanks were cut from the sheet and incorporated into a shoe upper. The upper was then lasted and subjected to a high-frequency field of 2.6 kilovolts at a frequency of 130 megacycles for about 15 seconds. A stiff box toe resulted.

Example II

A mixture of 68 parts by weight of isoprene and 58.5 parts by weight of acetyl thiophene and 0.3 part by weight of benzoyl peroxide was charged into an autoclave and heated under pressure to a temperature of about 135° C. under steam pressure of 30 pounds per square inch above atmospheric pressure for 20 hours. Heating was then discontinued and the product discharged from the autoclave and purified as in Example I.

The product obtained was a thick, dark-brown liquid vulcanizable with sulfur and useful for plasticizing resinous materials.

Example III 70 parts by weight of methyl pentadiene, 53.2 parts by weight of thiophene and 1.2 parts by weight of diazoaminobenzene were charged into an autoclave and subjected to heating for 17 hours at a temperature of 105° to 115° C. and a nitrogen pressure of 900 pounds per square inch. On completion of heating, the product was discharged from the autoclave and was purified by methanol treatment as in Example I to form a dark-brown, highly viscous liquid.

Example IV 68 parts by weight of isoprene, 51 parts by weight of 3-methyl-thiophene, and 0.6 part of diazoaminobenzene were charged into an autoclave and heated to a temperature of about 116° C. for 20 hours under nitrogen pressure of 1200 pounds per square inch. At the end of the heating, the product was discharged from the autoclave and subjected to the methanol purification treatment as in Example I. There was obtained a light buff-colored very viscous liquid.

Example V

A mixture of 51 parts by weight of isoprene, 79.8 parts by weight of thiophene, and 0.3 part by weight of tertiary butyl hydroperoxide was introduced into an autoclave and heated at a temperature of 90° to 95° C. for 14 hours at a nitrogen pressure of 1000 to 1200 pounds per square inch. The liquid reaction was discharged from the autoclave and poured into excess methanol from which the alcohol insoluble viscous liquid polymer separated. The layer of methanol was decanted and the liquid polymer heated to expel methanol. The product was a dark, viscous liquid.

Having described the invention, what I claim as new and desire to secure by Letters Patent of the United States is:

1. The process of preparing a sulfur vulcanizable copolymer of a conjugated diene having from 4 to 6 carbon atoms and from 60% to 140% based on the weight of the diene of a thiophene from the group consisting of thiophene, 3-methyl thiophene and 2-acetyl thiophene which comprises heating the diene and the thiophene in the presence of from 0.1 to 1.0% of a radical-forming catalyst from the group consisting of organic peroxides and diazoaminobenzene.

2. The process of preparing sulfur vulcanizable copolymer of a conjugated diene having from 4 to 6 carbon atoms and from 60% to 140% based on the weight of the diene, of a thiophene from the group consisting of thiophene, 3-methyl thiophene, and 2-acetyl thiophene which comprises heating a mixture of the diene and the thiophene in the presence of 0.1% to 1.0% based on the weight of the reaction mixture of a radical-forming catalyst from the group consisting of organic peroxides and diazoaminobenzene to a temperature of from 90° C. to 130° C. under pressure of from 400 to 1200 pounds per square inch.

3. The process of preparing sulfur vlucanizable copolymer of a conjugated diene having from 4 to 6 carbon atoms and from 60% to 140% based on the weight of the diene, of thiophene, which comprises heating a mixture of the diene and the thiophene in the presence of 0.1% to 1.0% based on the weight of the reaction mixture of a radical-forming catalyst from the group consisting of organic peroxides and diazoaminobenzene to a temperature of from 90° C. to 130° C. under pressure of from 400 to 1200 pounds per square inch.

4. The process of preparing sulfur vulcanizable copolymer of a conjugated diene having from 4 to 6 carbon atoms and from 60% to 140% based on the weight of the diene, of 3-methyl thiophene, which comprises heating a mixture of the diene and the 3-methyl thiophene in the presence of 0.1% to 1.0% based on the weight of the reaction mixture of a radical-forming catalyst from the group consisting of organic peroxides and diazoaminobenzene to a temperature of from 90° C. to 130° C. under pressure of from 400 to 1200 pounds per square inch.

5. The process of preparing sulfur vulcanizable copolymer of a conjugated diene having from 4 to 6 carbon atoms and from 60% to 140% based on the weight of the diene, of 2-acetyl thiophene which comprises heating a mixture of the diene and the 2-acetyl thiophene in the presence of 0.1% to 1.0% based on the weight of the reaction mixture of a radical-forming catalyst from the group consisting of organic peroxides and diazoaminobenzene to a temperature of from 90° C. to 130° C. under pressure of from 400 to 1200 pounds per square inch.

6. A vulcanizable composition comprising a viscous liquid copolymer formed in the presence of a catalyst from the group consisting of organic peroxides and diazoaminobenzene of 100 parts by weight of a conjugated diene having from 4 to 6 carbon atoms and from 60 to 140 parts by weight of a thiophene from the group consisting of thiophene, 3-methyl thiophene and 2-acetyl thiophene, sulfur, and a vulcanization assistant.

7. A soft deformable composition convertible by heat to resilient condition which comprises an intimate mixture of a rubbery hydrocarbon polymer, a viscous liquid copolymer formed in the presence of a catalyst from the group consisting of organic peroxides and diazoaminobenzene of 100 parts by weight of a conjugated diene having from 4 to 6 carbon atoms and from 60 to 140 parts by weight of a thiophene from the group consisting of thiophene, 3-methyl thiophene and 2-acetyl thiophene, sulfur and a vulcanization assistant, the liquid copolymer constituting from 25% to 50% by weight of the combined weights of said rubbery polymer and said liquid copolymer.

8. A soft deformable composition convertible by heat to resilient condition which comprises an intimate mixture of a rubbery hydrocarbon polymer, a viscous liquid copolymer formed in the presence of a catalyst from the group consisting of organic peroxides and diazoaminobenzene of 100 parts by weight of a conjugated diene having from 4 to 6 carbon atoms and from 60 to 140 parts by weight of thiophene, sulfur and a vulcanization assistant, the liquid copolymer constituting from 25% to 50% by weight of the combined weights of said rubbery polymer and said liquid copolymer.

9. A soft deformable composition convertible by heat to resilient condition which comprises an intimate mixture of a rubbery hydrocarbon polymer, a viscous liquid copolymer formed in the presence of a catalyst from the group consisting of organic peroxides and diazoaminobenzene of 100 parts by weight of a conjugated diene having from 4 to 6 carbon atoms and from 60 to 140 parts by weight of 3-methyl thiophene, sulfur and a vulcanization assistant, the liquid copolymer constituting 25% to 50% by weight of the combined weights of said rubbery polymer and said liquid copolymer.

10. A soft deformable composition convertible by heat to resilient condition which comprises an intimate mixture of a rubbery hydrocarbon polymer, a viscous liquid copolymer formed in the presence of a catalyst from the group consisting of organic peroxides and diazoaminobenzene of 100 parts by weight of a conjugated diene having from 4 to 6 carbon atoms and from 60 to 140 parts by weight of 2-acetyl thiophene, sulfur and a vulcanization assistant, the liquid copolymer constituting 25% to 50% by weight of the combined weights of said rubbery polymer and said liquid copolymer.

11. A viscous liquid sulfur vulcanizable copolymer of a conjugated diene having from 4 to 6 carbon atoms and from 60% to 140% based on the weight of the diene of a thiophene from the group consisting of thiophene, 3-methyl thiophene, and 2-acetyl thiophene said copolymer having been prepared by the process of claim 4.

References Cited in the file of this patent

UNITED STATES PATENTS

| Number | Name | Date |
| --- | --- | --- |
| 2,008,491 | Ebert | July 16, 1935 |
| 2,337,681 | Pollack | Dec. 28, 1943 |
| 2,469,326 | Caesar | May 3, 1949 |
| 2,489,674 | Rittershousen | Nov. 29, 1949 |
| 2,490,270 | Johnson | Dec. 6, 1949 |
| 2,505,204 | Pitzer | Apr. 25, 1950 |